United States Patent
Lewis

(10) Patent No.: US 10,155,355 B2
(45) Date of Patent: Dec. 18, 2018

(54) PANEL AND ASSOCIATED CLOSEOUT METHOD

(71) Applicant: The Boeing Company, Chicago, IL (US)

(72) Inventor: Michael S. Lewis, Lake Forest Park, WA (US)

(73) Assignee: The Boeing Company, Chicago, IL (US)

(*) Notice: Subject to any disclaimer, the term of this patent is extended or adjusted under 35 U.S.C. 154(b) by 117 days.

(21) Appl. No.: 14/856,824

(22) Filed: Sep. 17, 2015

(65) Prior Publication Data
US 2017/0080670 A1    Mar. 23, 2017

(51) Int. Cl.
*B32B 3/02* (2006.01)
*B32B 3/08* (2006.01)
(Continued)

(52) U.S. Cl.
CPC .......... *B32B 3/02* (2013.01); *B29C 63/0026* (2013.01); *B32B 3/08* (2013.01); *B32B 3/12* (2013.01); *B32B 5/02* (2013.01); *B32B 5/18* (2013.01); *B32B 7/02* (2013.01); *B32B 7/04* (2013.01); *B32B 7/12* (2013.01); *B32B 27/06* (2013.01); *B32B 37/12* (2013.01); *B64D 11/00* (2013.01); *B32B 2250/40* (2013.01); *B32B 2250/44* (2013.01); *B32B 2260/021* (2013.01); *B32B 2305/024* (2013.01); *B32B 2307/4023* (2013.01); *B32B 2307/72* (2013.01); *B32B 2451/00* (2013.01); *B32B 2605/18* (2013.01); *B32B 2607/00* (2013.01);
(Continued)

(58) Field of Classification Search
CPC .............. B32B 3/02; B32B 3/08; B32B 7/12
See application file for complete search history.

(56) References Cited

U.S. PATENT DOCUMENTS

| 3,235,040 A | 2/1966 | Ellis |
| 3,552,329 A * | 1/1971 | Parris ................. B65D 19/0002 108/51.11 |

(Continued)

FOREIGN PATENT DOCUMENTS

| DE | 10 2008 022591 A1 | 12/2009 |
| EP | 1527844 A1 * | 5/2005 ............. B23K 26/24 |

(Continued)

OTHER PUBLICATIONS

Machine Translation of FR 2686043, 2018 (Year: 2018).*
(Continued)

*Primary Examiner* — Liam J Heincer
(74) *Attorney, Agent, or Firm* — Walters & Wasylyna LLC

(57) ABSTRACT

A panel having a layered structure including a core defining a first edge and a face sheet connected to the core, the face sheet including a protruding portion defining a second edge, wherein the second edge protrudes outward a distance from the first edge, and a trim piece connected to the layered structure, the trim piece including a trim member and a flange member extending from the trim member, the trim member defining a visible surface and a trim edge, wherein the trim member is positioned over the first edge, wherein the trim edge is connected to the protruding portion, and wherein the flange member is connected to the layered structure.

22 Claims, 3 Drawing Sheets

(51) Int. Cl.
*B32B 3/12* (2006.01)
*B32B 5/02* (2006.01)
*B32B 5/18* (2006.01)
*B32B 7/02* (2006.01)
*B32B 7/04* (2006.01)
*B32B 7/12* (2006.01)
*B64C 1/00* (2006.01)
*B64C 1/06* (2006.01)
*B29C 63/00* (2006.01)
*B32B 27/06* (2006.01)
*B32B 37/12* (2006.01)
*B64D 11/00* (2006.01)

(52) U.S. Cl.
CPC ...... *B64C 1/066* (2013.01); *B64C 2001/0072* (2013.01); *B64D 11/0023* (2013.01); *Y02T 50/43* (2013.01)

(56) References Cited

U.S. PATENT DOCUMENTS

| | | | | | |
|---|---|---|---|---|---|
| 3,769,767 | A * | 11/1973 | Scott | ........................ | E04C 2/365 181/288 |
| 3,948,347 | A * | 4/1976 | Rutledge | ................... | E04B 1/86 181/291 |
| 4,037,006 | A * | 7/1977 | Roberts | ................ | B28B 11/042 156/201 |
| 4,724,638 | A * | 2/1988 | Bezborodko | ......... | E04F 13/144 52/311.1 |
| 4,748,780 | A * | 6/1988 | Vinther | ................ | A47B 13/083 52/309.13 |
| 5,034,256 | A * | 7/1991 | Santiso, III | ............... | B32B 3/02 428/116 |
| 2007/0227089 | A1* | 10/2007 | Lewis | .................... | B64D 11/00 52/468 |
| 2009/0107312 | A1* | 4/2009 | Lewis | .................... | B26D 3/065 83/76.1 |
| 2010/0112265 | A1* | 5/2010 | Leng | ........................ | B32B 3/12 428/53 |
| 2010/0264697 | A1* | 10/2010 | Stachura | ................... | B32B 1/00 296/191 |
| 2011/0091685 | A1* | 4/2011 | Farooq | ..................... | B32B 3/02 428/141 |
| 2012/0040135 | A1* | 2/2012 | Werthen | ..................... | B32B 3/08 428/138 |
| 2013/0071604 | A1* | 3/2013 | Lemieux | ................... | B32B 3/02 428/71 |
| 2013/0202841 | A1* | 8/2013 | Kompe | ...................... | B32B 3/02 428/76 |
| 2015/0368896 | A1* | 12/2015 | Schulte | ...................... | E04B 1/54 403/364 |
| 2016/0031184 | A1* | 2/2016 | Lewis | ........................ | B32B 7/08 428/136 |
| 2016/0163579 | A1* | 6/2016 | Nakamura | .......... | H01L 21/6835 428/64.1 |
| 2016/0258462 | A1* | 9/2016 | Lewis | ..................... | B64D 11/00 |
| 2016/0318264 | A1* | 11/2016 | Reeves | ................. | B29C 70/683 |
| 2016/0354991 | A1* | 12/2016 | Sueoka | ................... | B29C 43/18 |
| 2017/0036750 | A1* | 2/2017 | Lewis | ........................ | B64C 1/12 |

FOREIGN PATENT DOCUMENTS

| | | |
|---|---|---|
| FR | 2 686 043 A1 | 7/1993 |
| WO | WO 85/03540 A1 | 8/1985 |
| WO | WO 2010/064916 A1 | 6/2010 |

OTHER PUBLICATIONS

Machine Translation of EP 1527844, 2018 (Year: 2018).*
European Patent Office, Extended European Search Report, EP 16 17 7406 (dated Feb. 1, 2017).
European Patent Office, Communication pursuant to Article 94(3) EPC, EP 16 177 406.2 (dated Feb. 2, 2018).

* cited by examiner

PANEL AND ASSOCIATED CLOSEOUT METHOD

FIELD

This application relates to panels and, more particularly, to sandwich panels and, even more particularly, to edge closeout for sandwich panels.

BACKGROUND

Sandwich panels are typically formed from a core sandwiched between two face sheets. The core may be relatively thick, yet lightweight, as compared to the face sheets. The face sheets may be relative thin, yet stiff. Therefore, sandwich panels typically possess relatively high strength and stiffness at relatively low weight.

Because of their relatively high strength and stiffness at relatively low weight, sandwich panels are widely used in various aerospace applications. For example, sandwich panels are used in the construction of aircraft, such as commercial aircraft. Specifically, sandwich panels are used as the flooring, walls and bulkheads that define the passenger cabin of an aircraft.

Thus, sandwich panels on aircraft are often readily visible to aircraft passengers and personnel. As such, visible edges of sandwich panels are typically closed out to conceal the layered construction of the sandwich panel.

Various edge closeout techniques for sandwich panels have been developed. For example, the "ditch and pot" edge closeout technique involves removing the core material to a certain depth (e.g., 0.5 inch) and then filling the resulting recess with a composite potting material. The composite potting material must be cured, sanded and then finished (e.g., with paint). The resulting edge closeout is sharp and non-radiused, which is aesthetically desired by aircraft designers. However, the "ditch and pot" edge closeout technique is labor intensive and, therefore, expensive, and also adds significant weight of the aircraft.

Accordingly, those skilled in the art continue with research and development efforts in the field of edge closeout for sandwich panels.

SUMMARY

In one embodiment, the disclosed panel may include a layered structure including a core defining a first edge and a face sheet connected to the core, the face sheet including a protruding portion defining a second edge, wherein the second edge protrudes outward a distance from the first edge, and a trim piece connected to the protruding portion, the trim piece covering the first edge.

In another embodiment, the disclosed panel may include a layered structure including a core defining a first edge and a face sheet connected to the core, the face sheet including a protruding portion defining a second edge, wherein the second edge protrudes outward a distance from the first edge, and a trim piece connected to the layered structure, the trim piece including a trim member and a flange member extending from the trim member, the trim member defining a visible surface and a trim edge, wherein the trim member is positioned over the first edge, wherein the trim edge is connected to the protruding portion, and wherein the flange member is connected to the layered structure.

In yet another embodiment, the disclosed panel may include a layered structure including a core having a first major side and a second major side, the core defining a first edge extending between the first major side and the second major side, a first face sheet connected to the first major side, the first face sheet including an internal surface and an external surface, and a second face sheet connected to the second major side, the second face sheet including an internal surface and an external surface, and a trim piece connected to the layered structure, the trim piece including a trim member and a flange member extending from the trim member, the trim member defining a visible surface and a trim edge, wherein the trim edge is connected to the internal surface of the first face sheet and the flange member is connected to the external surface of the second face sheet.

In one embodiment, the disclosed edge closeout method may include the steps of (1) forming a layered structure including a core, a first face sheet connected to a first major side of the core and a second face sheet connected to a second major side of the core, wherein the core includes a first edge, the first face sheet includes a second edge and the second face sheet includes a third edge, the second edge protruding outward a distance from the first edge, and (2) connecting to the layered structure a trim piece including a trim member and a flange member such that a trim edge of the trim member is connected to an internal surface of the first face sheet and the flange member is connected to an external surface of the second face sheet.

Other embodiments of the disclosed panel and associated closeout method will become apparent from the following detailed description, the accompanying drawings and the appended claims.

DETAILED DESCRIPTION

Figure 1:
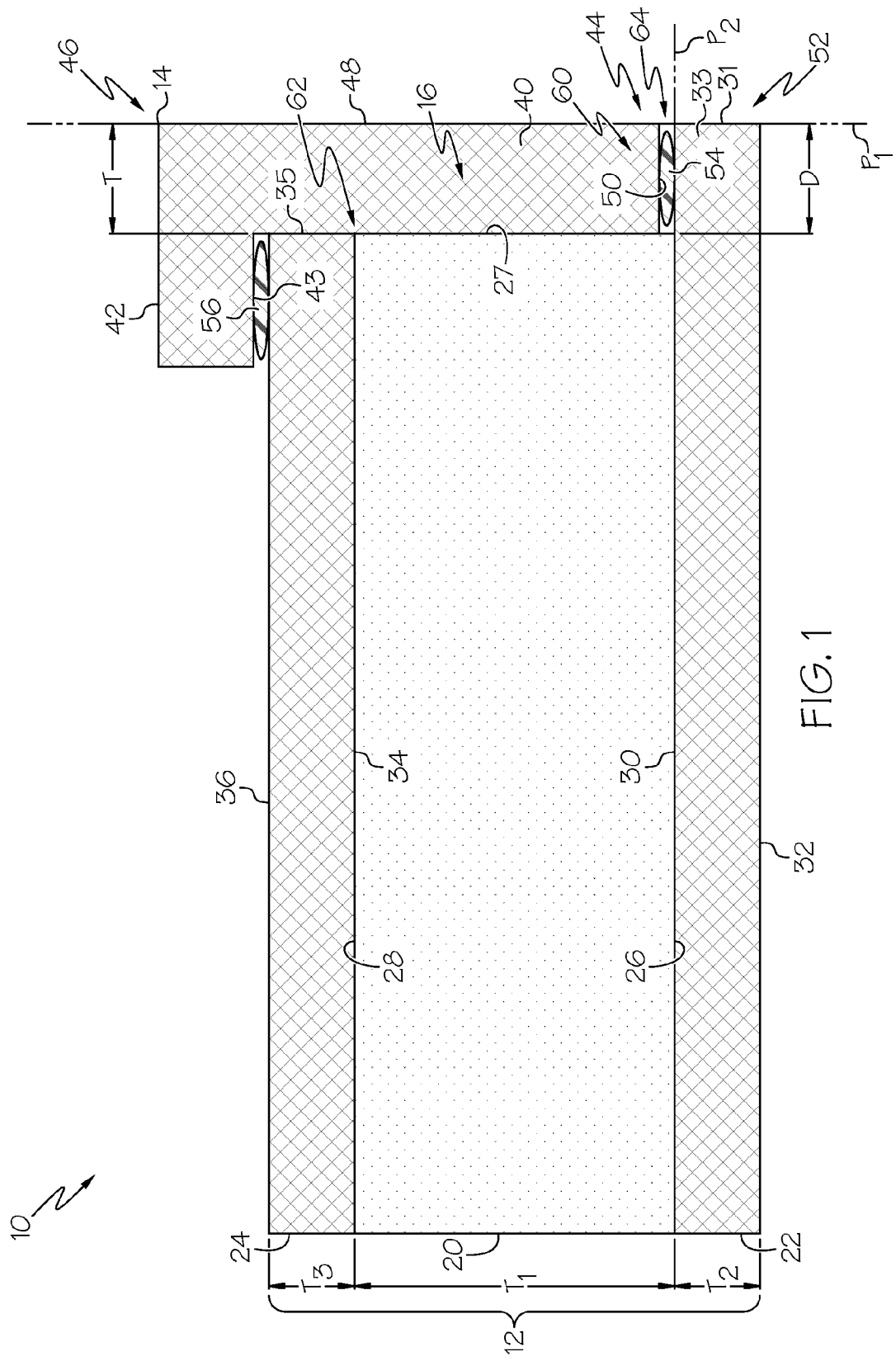
FIG. 1 is a schematic side cross-sectional view of one embodiment of the disclosed panel with edge closeout.

Referring to FIG. 1, one embodiment of the disclosed panel, generally designated 10, may include a layered structure 12 and a trim piece 14. The layered structure 12 may define a panel edge 16 and the trim piece 14 may be connected to the layered structure 12 to close out the panel edge 16.

In one particular implementation, the layered structure 12 may include a core 20, a first face sheet 22 and a second face sheet 24. The core 20 may include a first major side 26 and an opposed second major side 28, and may define a first edge 27 extending between the first major side 26 and the second major side 28. The first face sheet 22 may include an internal surface 30 and an opposed external surface 32, and may define a second edge 31 extending between the internal surface 30 and the external surface 32. The external surface 32 of the first face sheet 22 may be the visible surface of the layered structure 12. The second face sheet 24 may include an internal surface 34 and an opposed external surface 36, and may define a third edge 35 extending between the internal surface 34 and the external surface 36.

Thus, the layered structure 12 may be formed by sandwiching the core 20 between the first face sheet 22 and the second face sheet 24. Specifically, the internal surface 30 of the first face sheet 22 may be connected (e.g., adhered, welded, braised, mechanically fastened etc.) to the first major side 26 of the core 20 and the internal surface 34 of the second face sheet 24 may be connected (e.g., adhered, welded, braised, mechanically fastened etc.) to the second major side 28 of the core 20. As such, the first edge 27 of the core 20, the second edge 31 of the first face sheet 22 and the third edge 35 of the second face sheet 24 may define the panel edge 16 of the layered structure 12.

While the layered structure 12 of the panel 10 is shown with three layers 20, 22, 24, additional layers, such as additional core layers, additional face sheets and/or additional other layers, may be included without departing from the scope of the present disclosure. Furthermore, the second face sheet 24 may be optional and, therefore, may be omitted from the layered structure 12 of the panel 10 without departing from the scope of the present disclosure.

The cross-sectional thickness $T_1$ of the core 20 of the layered structure 12 may be relatively thick, as compared to the cross-sectional thicknesses $T_2$, $T_3$ of the first face sheet 22 and the second face sheet 24 (e.g., $T_1 > T_2$ and $T_1 > T_3$). For example, the cross-sectional thickness $T_1$ of the core 20 may be two or more times greater (e.g., five times greater) than the cross-sectional thickness $T_2$ of the first face sheet 22. However, the core 18 may have a relatively lower density (basis weight divided by cross-sectional thickness), as compared to the densities of the first face sheet 22 and the second face sheet 24.

Structurally, the core 20 of the layered structure 12 may be solid. However, lower densities may be achieved using a non-solid structure. As one specific, non-limiting example, the core 20 may be (or may include) a foam. As another specific, non-limiting example, the core 20 may be fluted or may include fluting. As yet another specific, non-limiting example, the core 20 may be (or may include) a honeycomb structure.

Compositionally, the core 20 may be formed from the same, similar or different materials than the first 22 and second 24 face sheets. However, the core 20 may typically be a structure with less density than the face sheets 22, 24. As one specific, non-limiting example, the core 20 may be formed from a polymer (e.g., expanded polystyrene). As another specific, non-limiting example, the core 20 may be a honeycomb structure formed from a composite, such as a carbon fiber-reinforced composite, a fiberglass-reinforced composite, a ceramic fiber-reinforced composite or a metal fiber-reinforced composite. As yet another specific, non-limiting example, the core 20 may be a honeycomb structure formed from a ceramic or metal, such as titanium, steel, aluminum or an aluminum alloy.

The first face sheet 22, which may be single ply or multi-ply, may be any material capable of being layered over and connected to the core 20. As one specific, non-limiting example, the first face sheet 22 may be a polymer, such as a polymer film, sheet or mesh. As another specific, non-limiting example, the first face sheet 22 may be a composite, such as a carbon fiber-reinforced composite, a fiberglass-reinforced composite, a ceramic fiber-reinforced composite or a metal fiber-reinforced composite. As another specific, non-limiting example, the first face sheet 22 may be a ceramic. As yet another specific, non-limiting example, the first face sheet 22 may be a metal film, sheet or mesh.

The first face sheet 22 may include a protruding portion 33 extend beyond the first edge 27 of the core 20 such that the second edge 31 of the first face sheet 22 protrudes a distance D from the first edge 27 of the core 20. In one expression, the distance D may be at least 0.04 inch (1 millimeter). In another expression, the distance D may be at least 0.08 inch (2 millimeters). In another expression, the distance D may be at least 0.12 inch (3 millimeters). In yet another expression, the distance D may be at most 0.2 inch (5 millimeters). Therefore, the panel edge 16 of the layered structure 12 may include a stepped transition from the core 20 to the first face sheet 22.

Optionally, the external surface 32 of the first face sheet 22 of the layered structure 12 may be coated with a decorative material. As one specific, non-limiting example, the external surface 32 of the first face sheet 22 may be coated with paint. As another specific, non-limiting example, the external surface 32 of the first face sheet 22 may be coated with a decorative laminate.

The second face sheet 24, which may be single ply or multi-ply, may be formed from the same, similar or different material than the first face sheet 22. As one specific, non-limiting example, the second face sheet 24 may be a polymer, such as a polymer film, sheet or mesh. As another specific, non-limiting example, the second face sheet 24 may be a composite, such as a carbon fiber-reinforced composite, a fiberglass-reinforced composite, a ceramic fiber-reinforced composite or a metal fiber-reinforced composite. As yet another specific, non-limiting example, the second face sheet 24 may be a metal film, sheet or mesh.

The second face sheet 24, specifically the third edge 35 of the second face sheet 24, may be substantially flush 62 with the first edge 27 of the core 20. Therefore, the panel edge 16 of the layered structure 12 may include a substantially continuous transition from the second face sheet 24 to the core 20.

In FIG. 1, only a portion of the layered structure 12 of the panel 10 is shown. Those skilled in the art will appreciate that the overall size and shape of the layered structure 12 may depend on the end application. For example, the panel 10 may be used to construct the interior 222 (FIG. 4) of an aircraft 202 (FIG. 4) and, therefore, may be sized and shaped accordingly. Additionally, while the layered structure 12 is shown in FIG. 1 as being a substantially planar structure, non-planar panels (e.g., curved panels) are also contemplated.

The trim piece 14 of the panel 10 may be connected to the layered structure 12 to close out the panel edge 16. Significantly, the panel 10 is configured such that the trim piece 14 effects the desired closeout, yet remains hidden behind the first face sheet 22 of the layered structure 12.

The trim piece 14 of the panel 10 may include a trim member 40 and a flange member 42. The trim member 40 may have a thickness T, which may be substantially equal to the distance D, and may include a first end 44 and an opposed second end 46. The trim member 40 may define a visible surface 48 extending between the first end 44 and the second end 46, and a trim edge 50 proximate (at or near) the first end 44. The flange member 42 may extend outward proximate (at or near) the second end 46 of the trim member 40. Therefore, the trim piece 14 may have an L-shaped cross-sectional profile, as shown in FIG. 1.

The flange member 42 of the trim piece 14 may be integral with the trim member 40 (i.e., the trim member 40 and the flange member 42 may be formed as a single monolithic body). Alternatively, the flange member 42 may be a separate piece that has been connected to the trim member 40, such by bonding (e.g., with an adhesive) or welding (e.g., ultrasonic welding).

The trim piece 14 of the panel 10 may be formed from the same, similar or different material than the first face sheet 22. Various compositions may be used without departing from the scope of the present disclosure. As one specific, non-limiting example, the trim piece 14 may be formed from (or may include) a polymeric material, which may be reinforced or non-reinforced. As another specific, non-limiting example, the trim piece 14 may be formed from (or may include) a composite material, such as a carbon fiber-reinforced composite, a fiberglass-reinforced composite, a ceramic fiber-reinforced composite or a metal fiber-reinforced composite. As another specific, non-limiting example, the trim piece 14 may be formed from (or may include) a metal or metal alloy. As yet another specific, non-limiting example, the trim piece 14 may be formed from (or may include) a cellulosic material, such as wood.

The trim piece 14 of the panel 10 may be connected to the layered structure 12 such that the trim member 40 is positioned over the first edge 27 of the core 20, the trim edge 50 abuts the internal surface 30 of the first face sheet 22, and the flange member 42 (specifically the engagement surface 43 of the flange member 42) abuts the layered structure 12 (e.g., the external surface 36 of the second face sheet 24). Therefore, the visible surface 48 of the trim member 40 may be substantially flush 64 with the second edge 31 of the first face sheet 22.

In one particular construction, the trim piece 14 of the panel 10 may be connected to the layered structure 12 such that a first plane $P_1$ coincident with the visible surface 48 of the trim member 40 is substantially perpendicular to a second plane $P_2$ coincident with the internal surface 30 of the first face sheet 22. Therefore, a sharp, 90 degree corner 52 may be defined by the first face sheet 22 and the trim piece 14.

Connection between trim piece 14 of the panel 10 and the layered structure 12 may be effected using various techniques. As one specific, non-limiting example, an adhesive, such as an epoxy-based or urethane-based adhesive, may be used to connect the trim piece 14 to the layered structure 12.

As shown in FIG. 1, a two-point adhesive connection may be used to connect the trim piece 14 to the layered structure 12. Specifically, a first adhesive portion 54 may be positioned between the trim edge 50 of the trim piece 14 and the internal surface 30 of the first face sheet 22, and a second adhesive portion 56 may be positioned between the flange member 42 of the trim piece 14 and the layered structure 12 (e.g., the external surface 36 of the second face sheet 24). Those skilled in the art will appreciate that fewer or additional adhesive portions may be used, such as between the trim member 40 and the core 20, and/or between the trim member 40 and the third edge 35, without departing from the scope of the present disclosure.

Figure 2:
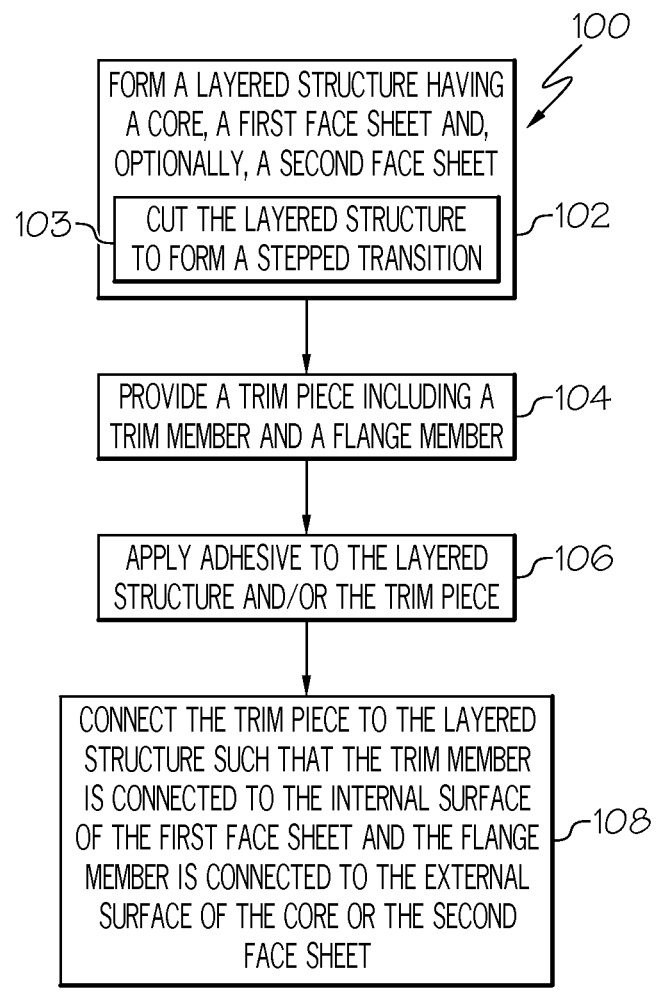
FIG. 2 is a flow diagram of one embodiment of the disclosed edge closeout method.

Referring to FIG. 2, as well as to the structure shown in FIG. 1, one embodiment of the disclosed edge closeout method, generally designated 100, may begin at Block 102 with the step of forming a layered structure 12 that includes a core 20 (having a first edge 27), a first face sheet 22 (having a second edge 31) and, optionally, a second face sheet 24 (having a third edge 35), wherein the panel edge 16 (edges 27, 31, 35) of the layered structure 12 includes a stepped transition 60 from the core 20 to the first face sheet 22 (see distance D in FIG. 1).

Various techniques may be used during the forming step (Block 102) to achieve the desired stepped transition 60 in the layered structure 12. In one specific implementation, shown in Block 103, the forming step (Block 102) may include the step of cutting the layered structure 12 to achieve the stepped transition 60. As one non-limiting example, a computerized numerical control (CNC) machine may be used to cut the layered structure 12 and form the stepped transition 60. As another non-limiting example, a router, such as a hand-held router, may be used to cut the layered structure 12 and form the stepped transition 60. It is also contemplated that the stepped transition 60 may be formed without the need for cutting the layered structure 12.

At Block 104, a trim piece 14 may be provided. The trim piece 14 may include a trim member 40 and a flange member 42. The trim member 40 may include a visible surface 48 and a trim edge 50. The flange member 42 may include an engagement surface 43.

At Block 106, an adhesive may be applied, such as prior to the connecting step of Block 108. As one example, the adhesive may be applied to the trim piece 14, such as to the trim edge 50 of the trim member 40 and/or to the engagement surface 43 of the flange member 42. As another example, the adhesive may be applied to the layered structure 12, such as to the portion of the internal surface 30 of the first face sheet 22 proximate the second edge 31 and/or to the portion of the external surface 36 of the second face sheet 24 proximate the third edge 35. As yet another example, the adhesive may be applied to both the trim piece 14 and the layered structure 12.

At Block 108, the trim piece 14 may be connected to the layered structure 12 such that the trim edge 50 of the trim member 40 is connected to an internal surface 30 of the first face sheet 22 and the flange member 42 is connected to an external surface 36 of the second face sheet 24.

Figure 3:
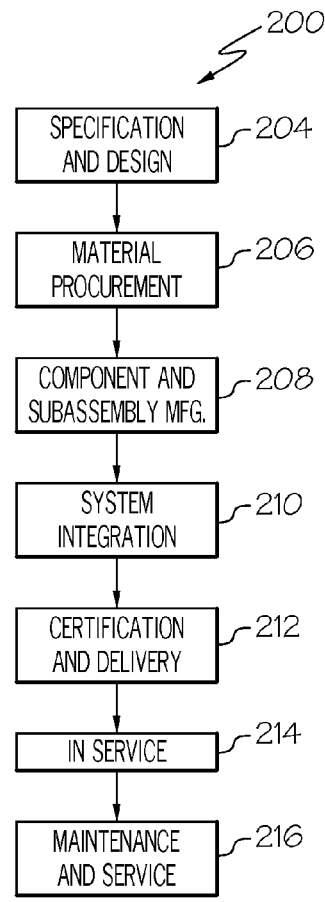
FIG. 3 is flow diagram of an aircraft manufacturing and service methodology.
Figure 4:
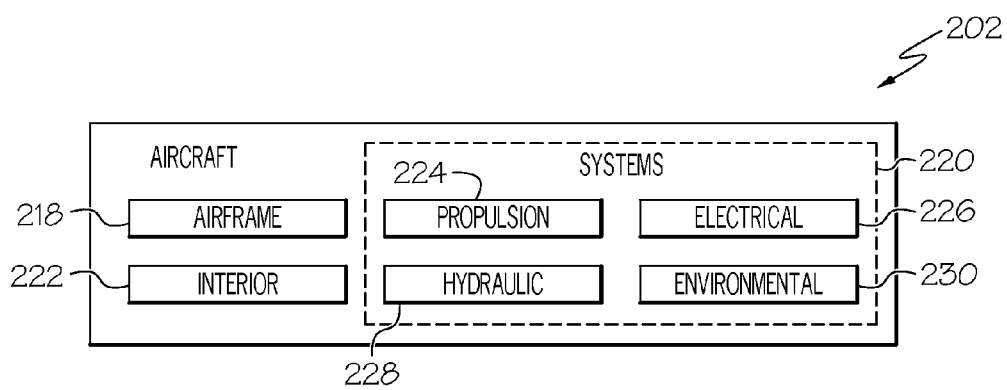
FIG. 4 is a block diagram of an aircraft.

Examples of the disclosure may be described in the context of an aircraft manufacturing and service method 200, as shown in FIG. 3, and an aircraft 202, as shown in FIG. 4. During pre-production, the aircraft manufacturing and service method 200 may include specification and design 204 of the aircraft 202 and material procurement 206. During production, component/subassembly manufacturing 208 and system integration 210 of the aircraft 202 takes place. Thereafter, the aircraft 202 may go through certification and delivery 212 in order to be placed in service 214. While in service by a customer, the aircraft 202 is scheduled for routine maintenance and service 216, which may also include modification, reconfiguration, refurbishment and the like.

Each of the processes of method 200 may be performed or carried out by a system integrator, a third party, and/or an operator (e.g., a customer). For the purposes of this description, a system integrator may include without limitation any number of aircraft manufacturers and major-system subcontractors; a third party may include without limitation any number of venders, subcontractors, and suppliers; and an operator may be an airline, leasing company, military entity, service organization, and so on.

As shown in FIG. 4, the aircraft 202 produced by example method 200 may include an airframe 218 with a plurality of systems 220 and an interior 222. Examples of the plurality of systems 220 may include one or more of a propulsion system 224, an electrical system 226, a hydraulic system 228, and an environmental system 230. Any number of other systems may be included.

The disclosed panel 10 and closeout method 100 may be employed during any one or more of the stages of the aircraft manufacturing and service method 200. As one example, the disclosed panel 10 and closeout method 100 may be employed during material procurement 206. As another example, components or subassemblies corresponding to component/subassembly manufacturing 208, system integration 210, and or maintenance and service 216 may be fabricated or manufactured using the disclosed panel 10 and closeout method 100. As another example, the airframe 218 and the interior 222 may be constructed using the disclosed panel 10 and closeout method 100. Also, one or more apparatus examples, method examples, or a combination thereof may be utilized during component/subassembly manufacturing 208 and/or system integration 210, for example, by substantially expediting assembly of or reducing the cost of an aircraft 202, such as the airframe 218 and/or the interior 222. Similarly, one or more of system examples, method examples, or a combination thereof may be utilized while the aircraft 202 is in service, for example and without limitation, to maintenance and service 216.

The disclosed panel 10 and closeout method 100 are described in the context of an aircraft; however, one of ordinary skill in the art will readily recognize that the disclosed panel 10 and closeout method 100 may be utilized for a variety of vehicles. For example, implementations of the embodiments described herein may be implemented in any type of vehicle including, e.g., helicopters, passenger ships, automobiles and the like.

Although various embodiments of the disclosed panel and associated closeout method have been shown and described, modifications may occur to those skilled in the art upon reading the specification. The present application includes such modifications and is limited only by the scope of the claims.

What is claimed is:
1. A panel comprising:
    a layered structure comprising:
        a core comprising a first major side and a second major side, said core defining a first end surface in the form of a line segment extending continuously from said first major side to said second major side;
        a first face sheet connected to said first major side of said core, said first face sheet comprising an internal surface and an external surface, said first face sheet comprising a protruding portion defining a second end surface, wherein said second end surface protrudes outward a distance from said first end surface of said core; and
        a second face sheet connected to said second major side of said core, said second face sheet defining a third end surface, wherein said third end surface of said second face sheet is substantially flush with said first end surface of said core such that said third end surface and said first end surface combine to form a continuous surface; and
    a trim member connected to said protruding portion, said trim member covering said first end surface, said trim member defining an internal surface, a visible external surface and a trim edge surface extending between said internal surface and said visible external surface of said trim member, wherein said visible external surface is substantially flush with said second end surface of said first face sheet such that said visible external surface and said second end surface combine to form a continuous surface, and wherein said trim edge surface is connected to said internal surface of said first face sheet.
2. The panel of claim 1 further comprising a flange member extending from said trim member, wherein said flange member is connected to said layered structure.
3. The panel of claim 2 further comprising an adhesive portion connecting said flange member to said layered structure.
4. The panel of claim 2 wherein said second face sheet comprises an internal surface and an external surface.
5. The panel of claim 4 wherein said flange member is connected to said external surface of said second face sheet.

6. The panel of claim 1 wherein a first plane coincident with said visible external surface of said trim member is substantially perpendicular to a second plane coincident with said internal surface of said first face sheet.
7. The panel of claim 1 wherein said external surface of said first face sheet is coated with at least one of a paint and a decorative laminate.
8. The panel of claim 1 further comprising an adhesive portion connecting said trim edge surface to said protruding portion.
9. The panel of claim 1 wherein said core comprises a honeycomb structure.
10. The panel of claim 1 wherein said distance is at least 0.04 inch (1 millimeter).
11. The panel of claim 1 wherein said distance is at most 0.2 inch (5 millimeter).
12. The panel of claim 1 wherein said trim member covers said third end surface of said second face sheet.
13. The panel of claim 12 further comprising a flange member proximate to an external surface of said second face sheet.
14. A method for fabricating a portion of an aircraft comprising using the panel of claim 1.
15. The panel of claim 1 wherein the trim member is formed from a different material than the first face sheet.
16. A panel comprising:
    a layered structure comprising:
        a core comprising a first major side and a second major side, said core defining a first end surface in the form of a line segment extending continuously from said first major side to said second major side;
        a first face sheet connected to said first major side, said first face sheet comprising an internal surface and an external surface, said first face sheet defining a second end surface extending between said internal surface and said external surface of said first face sheet, wherein said second end surface of said first face sheet protrudes outwardly a distance from said first end surface of said core; and
        a second face sheet connected to said second major side, said second face sheet comprising an internal surface and an external surface, said second face sheet defining a third end surface extending between said internal surface and said external surface of said second face sheet, wherein said third end surface of the second face sheet is substantially flush with said first end surface of said core such that said third end surface and said first end surface combine to form a continuous surface; and
    a trim piece connected to said layered structure, said trim piece comprising a trim member and a flange member extending from said trim member, said trim member comprising an internal surface and an external visible surface, said trim member defining a trim edge surface extending between said internal surface and said external visible surface of said trim member, wherein said external visible surface of said trim member is substantially flush with said second end surface of said first face sheet such that said external visible surface and said second end surface combine to form a continuous surface, wherein said trim edge surface is connected to said internal surface of said first face sheet and said flange member is connected to said external surface of said second face sheet.
17. An edge closeout method comprising:
    forming a layered structure comprising a core, a first face sheet connected to a first major side of said core and a second face sheet connected to a second major side of said core, wherein said core comprises a first end surface in the form of a line segment extending continuously from said first major side to said second major side, said first face sheet comprises a second end surface and said second face sheet comprises a third end surface, said second end surface protruding outward a distance from said first end surface, said third end surface of said second face sheet being substantially flush with said first end surface of said core such that said third end surface and said first end surface combine to form a continuous surface; and connecting to said layered structure a trim piece comprising a trim member and a flange member such that a trim edge surface of said trim member is connected to an internal surface of said first face sheet, such that said flange member is connected to an external surface of said second face sheet, and such that an external visible surface of said trim member is substantially flush with said second end surface of said first face sheet such that said external visible surface and said second end surface combine to form a continuous surface.

18. The method of claim 17 wherein said forming step comprises cutting said layered structure such that said second end surface protrudes outward from said first end surface.

19. The method of claim 17 further comprising applying an adhesive to at least one of said trim piece and said layered structure prior to said connecting step.

20. The method of claim 19 wherein, after said connecting step, said adhesive is positioned between said first face sheet and said trim edge surface.

21. The method of claim 20 wherein, after said connecting step, said adhesive is positioned between said second face sheet and said flange member.

22. A portion of an aircraft assembled using the method of claim 17.

* * * * *